United States Patent
Lyons et al.

[11] Patent Number: 5,872,536
[45] Date of Patent: Feb. 16, 1999

[54] MULTI-SENSOR ANTICIPATORY OBJECT DETECTION SYSTEM

[75] Inventors: Christopher T. Lyons, Tyngsboro; Ismail Taskin, Arlington, both of Mass.

[73] Assignee: Hittite Microwave Corporation, Woburn, Mass.

[21] Appl. No.: 808,939

[22] Filed: Feb. 19, 1997

[51] Int. Cl.⁶ .................................................. G01S 13/93
[52] U.S. Cl. ........................... 342/70; 342/107; 342/193
[58] Field of Search .................................. 342/70, 71, 72, 342/106, 107, 193

[56] References Cited

U.S. PATENT DOCUMENTS

| | | | |
|---|---|---|---|
| 3,832,709 | 8/1974 | Klein et al. | 342/127 |
| 3,860,923 | 1/1975 | Yamanaka et al. | 342/72 |
| 3,864,678 | 2/1975 | Yamanaka et al. | 342/59 |
| 3,893,114 | 7/1975 | Yamanaka et al. | 342/72 |
| 3,952,303 | 4/1976 | Watanabe et al. | 342/112 |
| 3,974,501 | 8/1976 | Ritzie | 342/128 |
| 4,003,049 | 1/1977 | Sterzer et al. | 342/43 |
| 4,008,473 | 2/1977 | Hinachi et al. | 342/84 |
| 5,517,196 | 5/1996 | Pakett et al. | 342/70 |
| 5,638,281 | 6/1997 | Wang | 342/29 X |
| 5,694,130 | 12/1997 | Suzuki et al. | 342/7 |

Primary Examiner—John B. Sotomayor
Attorney, Agent, or Firm—Iandiorio & Teska

[57] ABSTRACT

A multi-sensor anticipatory object detection system for detecting the instantaneous range, relative velocity, collision angle and point of impact of a colliding object includes a plurality of transducer devices angle a fixed distance in which each said transducer device transmits a modulated carrier signal and receives the reflected modulated carrier signal from an object; a detection device for detecting a plurality of Doppler shifted harmonic components from each said reflected signal; a range determining device, responsive to the amplitudes of said harmonic components, for determining the instantaneous range of said object from each said transducer device; a velocity measurement device, responsive to the frequency of said harmonic components, for determining the relative instantaneous velocity of said object; and an impact decision device, responsive to said range determining device and the velocity measurement device, for determining where, if at all, impact with the object will occur and the angle of the impact prior to impact with the object.

41 Claims, 10 Drawing Sheets

MULTI-SENSOR ANTICIPATORY OBJECT DETECTION SYSTEM

FIELD OF INVENTION

This invention relates to an anticipatory object detection system and more particularly to a multi-sensor anticipatory object detection system for detecting the instantaneous range, relative velocity, collision angle and point of impact of a colliding object prior to impact with object.

BACKGROUND OF INVENTION

Accelerometers used in frontal air-bag deployment systems are designed to measure only the head-on g force caused by a collision with an object. However, the normal component of the force experienced in non-head on collisions diminishes as the collision angle decreases. An object detection system consisting of a single, center mounted sensor with a single antenna is capable of measuring the radial distance and velocity of potential colliding objects that lie within the antenna beamwidth. However, because the radar measures the distance between the antenna element and the object, the system cannot discriminate between head on collisions and those which occur at an angle. Thus, a single sensor system cannot determine the angle at which the object will impact, nor the point of impact. To accomplish this, it is necessary to determine the normal velocity component of a colliding object. Typically, such a determination requires sophisticated and expensive equipment to determine the velocity of the object. A single sweeping antenna could be used to determine the normal velocity component. However, this would require at least two sweeps of the antenna which requires an antenna with beam steering capability or additional equipment and motors to sweep a fixed beamwidth antenna along with additional time necessary to complete the sweeps. Where the application is an object detection system for an automobile for detecting objects moving up to 120 MPH, time is precious and cannot be wasted while waiting for a second or third sweep of the antenna. Additionally, a single sweep antenna temporarily looses contact with the object between sweeps, and therefore, cannot continuously determine the instantaneous range of the object.

The normal component of the velocity of a colliding object can also be determined using a dual, narrow beam antenna system. However, the narrow beam does not provide sufficient coverage where the application is in an anticipatory object detection system for an automobile. In order to provide such sufficient coverage, larger sweeping antennas having vary fast steering sweeps are required. Such systems are extremely expensive.

SUMMARY OF INVENTION

It is therefore an object of this invention to provide a multi-sensor anticipatory object detection system which determines whether or not a collision with an object is imminent.

It is a further object of this invention to provide such a multi-sensor anticipatory object detection system which can determine the normal velocity component of the object.

It is a further object of this invention to provide such a multi-sensor anticipatory object detection system which can determine the angle at which an object will impact the automobile.

It is a further object of this invention to provide such a multi-sensor anticipatory object detection system which determines the point at which a colliding object will impact the automobile.

It is a further object of this invention to provide such a multi-sensor object detection system which is cost effective to manufacture and implement.

The invention results from the realization that a truly effective anticipatory object detection system can be achieved by using a plurality of transducer devices for transmitting a modulated carrier signal and receiving the reflecting signal from an object to determine the instantaneous range of the object with respect to one transducer and thereafter tracking the range of the object as it comes within range of another transducer. Once the object is within a predetermined range of the other transducer, the system can determine prior to impact with the object, the point of impact and the angle at which such impact will occur.

This invention features a multi-sensor anticipatory object detection system for detecting the instantaneous range, relative velocity, collision angle and point of impact of a colliding object and includes a plurality of transducer devices spaced a fixed distance in which each transducer device transmits a modulated carrier signal and receives the reflected modulated carrier signal from an object. There is a detection device for detecting a plurality of Doppler shifted harmonic components from each reflected signal. There is a range determining device, responsive to the amplitudes of the harmonic components, for determining the instantaneous range of the object from each transducer device. There is a velocity measurement device, responsive to the frequency of the harmonic components, for determining the relative instantaneous velocity of the object. There is an impact decision device, responsive to the range determining device and the velocity measurement device, for determining where, if at all, impact with the object will occur and the angle of the impact prior to the impact of the object.

In a preferred embodiment the plurality of transducer devices includes at least a first transducer device for receiving a first reflected modulated carrier signal having a first modulation signal and a second transducer device for receiving a second reflected modulated carrier signal having a second modulation signal. The velocity measurement device may include a first velocity measurement circuit, responsive to the frequency of the first modulation signal for determining a first relative velocity between the object and the first transducer device and a second velocity measurement circuit, responsive to the frequency of the second modulation signal, for determining a second relative velocity between the object and the second transducer device. The first velocity measurement circuit may include a first comparator device, responsive to one of the plurality of harmonic components of the first modulation signal, for providing a first Doppler pulse each time the amplitude of the harmonic component exceeds a predetermined level for monitoring the first relative velocity between the object and the first transducer device. The second velocity measurement circuit may include a second comparator device, responsive to one of the plurality of harmonic components of the second modulation signal, for providing a second Doppler pulse each time the amplitude of the harmonic component exceeds a predetermined level for monitoring the second relative velocity between the object and the second transducer device. The range determining device may include first detection means, responsive to the amplitudes of harmonic components of the first modulation signal, for detecting the occurrence of a first predetermined relationship between the harmonic components to determine the instantaneous range of the object from the first transducer device.

The range determining device may further include second detection means, responsive to the amplitudes of the harmonic components of the second modulation signal, for detecting the occurrence of a second predetermined relationship between the harmonic components to determine a second range of said object from said second transducer device. The impact decision device may include counting means, responsive to the occurrence of the first predetermined relationship, for counting the first Doppler pulse until the occurrence of the second predetermined relationship for indicating a third range of the object from the first transducer device. The impact decision device may further include a calculation device, the calculation device including first calculation means, responsive to the second range, the third range and the fixed distance, for determining the angle between the automobile and the heading of the object to the first transducer device. The calculation device may further include second calculation means, responsive to the first calculation means, for determining the angle between the heading of the object to the second transducer device and the heading to the first transducer device. The calculation device may further include third calculation means, responsive to the first relative velocity, the second relative velocity, the first calculation means and the second calculation means, for determining the velocity of the object relative to the automobile, the velocity including a normal component and a tangential component. The calculation device may further include fourth calculation means, responsive to the third calculation means, for determining the angle of impact. The calculation device may further include fifth calculation means, responsive to the third range, the first calculation means, the angle of impact and the fixed distance, for determining the point of impact. The impact decision device may include a calculation device, responsive to the occurrence of the first predetermined relationship and the occurrence of the second predetermined relationship for determining the point of impact of the object. The calculation device may include means, responsive to the first relative velocity and the second relative velocity, for determining the normal component of the relative instantaneous velocity of the object. The calculation device may further include means, responsive to the normal component, for determining the angle of the impact. The calculation device may further include impact means, responsive to the angle of impact, for determining the point of impact of the object. The impact means may include a lookup table for outputting the location of the point of impact in response to the angle of impact. The first detection means may include means for detecting whether the amplitude of one of the harmonic components of the first modulation signal exceeds a predetermined threshold value and the second detection means may include means for detecting whether the amplitude of one of the harmonic components of the second modulation signal exceeds the predetermined value. The first detection means may further include means for detecting when the difference in amplitude between one of the harmonic components relative to the amplitude of another of the harmonic components of the first modulation signal exceeds a second threshold value and the second detection means may further include means for detecting when the difference in amplitude between one of the harmonic components relative to the amplitude of another of the harmonic components of the second modulation signal exceeds the second threshold value. The first predetermined relationship may occur when one of the harmonic components equals another of the harmonic components of the first modulation signal and the second predetermined relationship may occur when one of the harmonic components equals another of the harmonic components of the second modulation signal. The first detection means may further include means for detecting the difference in amplitude between one of the harmonic components and yet another of the harmonic components of the first modulation signal and the second detection means may further include means for detecting the difference in amplitude between one of the harmonic components and yet another of the harmonic components of the second modulation signal. The first detection means may include means, responsive to one of the harmonic components of the first modulation signal, for determining the time to the occurrence of a third predetermined relationship between the amplitudes of at least two of the harmonic components of the first modulation signal. The second detection means may include means, responsive to one of the harmonic components of the second modulation signal, for determining the time to the occurrence of a fourth predetermined relationship between the amplitudes of at least two of the harmonic components of the second modulation signal. The impact decision device may further include means, responsive to the occurrence of the third predetermined relationship and the fourth predetermined relationship, for determining that impact with the object will occur and the time of the impact prior to impact with the object. One of the harmonic components of the first modulation signal may be the second harmonic component and one of the harmonic components of the second modulation signal may be the second the harmonic component. Another of the harmonic components of the first modulation signal may be the first harmonic component and another of the harmonic components of a second modulation signal may be the first harmonic component. Yet another of the harmonic components of the first modulation signal may be the DC component and yet another of the harmonic components of the second modulation signal may be the DC component. The first velocity measurement circuit may further include a first counting circuit, responsive to the first Doppler pulse, for accumulating a number of clock pulses for a period of time defined by the first Doppler pulse and a first velocity calculation device, responsive to the first counting circuit, for determining the first relative velocity of the object. The second velocity measurement circuit may further include a second counting circuit, responsive to the second Doppler pulse, for accumulating a number of clock pulses for a period of time defined by the second Doppler pulse and a second velocity calculation device, responsive to the second counting circuit, for determining the second relative velocity of the object. The range determining device may further include a counter device, responsive to the first counting circuit for counting the first Doppler pulse for a predetermined period of time after the occurrence of the first predetermined relationship for indicating the instantaneous distance between the first transducer device and the object. The range determining device may further include a counter device, responsive to the second counting circuit, for counting the second Doppler pulse for a predetermined period of time after the occurrence of the second predetermined relationship for indicating the instantaneous distance between the second transducer device and the object. Each transducer device may include a voltage controlled oscillator for producing a carrier signal, a modulation circuit for generating a modulation signal and mixing means for mixing said carrier signal and said modulation signal to provide the modulated carrier signal. The carrier signal may have a bandwidth of 100 MHz. The detection device may include a plurality of channels, each channel extracting one of a plurality of harmonic components from each modulation signal. Each of the plurality of channels may include a pulse shaping circuit. Each of the plurality of channels include an amplifier circuit for varying the amplitude of harmonic components thereby adjusting the relationship between the harmonic components relative to each other for each modulation signal. The pulse shaping circuit include means for rectifying each harmonic component. At least one of the plurality of channels may extract the Doppler of the DC component of each modulation signal. At least one of the plurality of channels may extract the Doppler of the first harmonic component of each modulation signal. At least one of the plurality of channels may extract the Doppler of the second harmonic component of each modulation signal.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
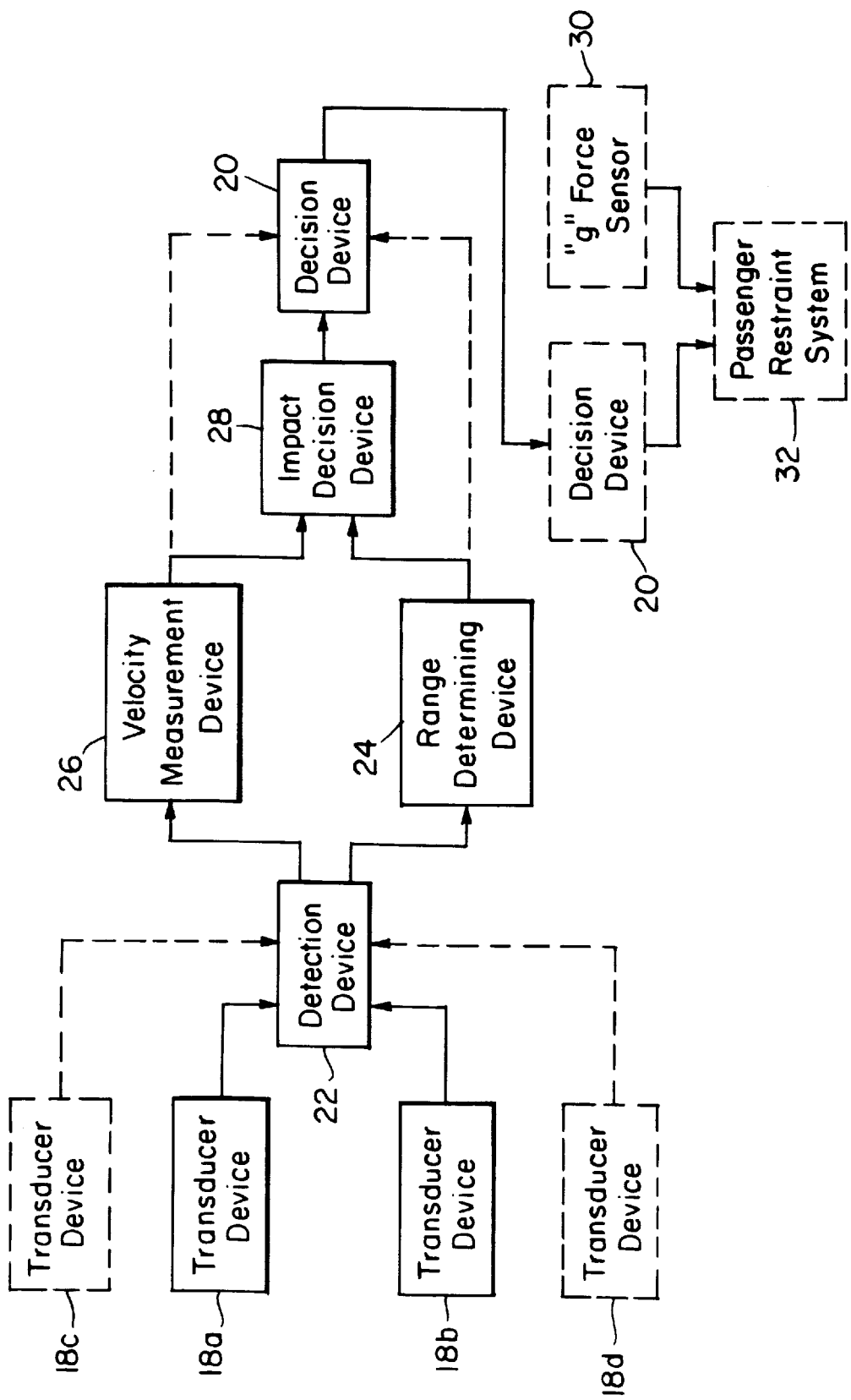
FIG. 1 is a simplified block diagram of the multi-sensor anticipatory object detection system according to this invention.

A simplified block diagram of the multi-sensor anticipatory object detection system according to this invention is shown in FIG. 1. There is at least a first transducer device 18a and a second transducer device 18b, each of which transmits a modulated carrier signal, such as a radar signal. It should be noted that while in the preferred embodiment, two sensors are sufficient given the width of a standard automobile, it is possible to use as many sensors as necessary, e.g. 18c, 18d . . . The signal is reflected by a potential colliding object and the reflected signal is received by the first transducer device 18a and second transducer device 18b. A detection device 22 contains two detection circuits, one associated with each transducer. Detection device 22 mixes the reflected modulated carrier signal with the modulated carrier signal to produce a composite Doppler shifted signal comprised of many different signals to include the Doppler shifted harmonic components of each reflected modulation signal: because there are multiple transducer devices, there is a reflected modulation signal associated with each transducer device. Thus, detection device 22 detects the Doppler shifted harmonic components of the modulation signal associated with each transducer device. There is associated with each harmonic component, a Doppler. Due to the Doppler effect the reflected modulation signal differs from the modulation signal by the Doppler frequency. The Doppler, which is the envelope of the individual harmonic components, has a frequency equal to the Doppler frequency and an amplitude equal to the amplitude of the individual harmonic component with which it is associated. Detection device 22 extracts the Doppler of predetermined harmonic components. In this embodiment the harmonic components of interest are the first harmonic component, second harmonic component and DC harmonic component of the modulation signal associated with each transducer device.

A range determining device 24 includes two range determining circuits which monitor the amplitudes of the Doppler of the harmonic components associated with each reflected modulation signal looking for predetermined relationships between the Doppler of each harmonic component. Because there are multiple transducers, an object will typically be detected by one transducer device before the other. The transducer device that detects the object first will determine the software that is used to track the object. When the object reaches a predetermined range with respect to the near transducer device, the instantaneous range of the object is known. This is discussed further in FIG. 3. Once this range is known, velocity measurement device 26 determines the instantaneous velocity of the object with respect to the near transducer device. Velocity measurement device 26 contains at least two velocity determining circuits, one associated with each transducer. The relative velocity is derived from the frequency of one of the harmonic components associated with that transducer device: velocity measurement device 26 produces a Doppler pulse associated with each reflected signal derived from one of the harmonic components. Range determining device 24 monitors the Doppler pulse thereafter, to track the instantaneous range of the object. As the object continues on its collision path, it is detected by the distant sensor, again at a predetermined range. Because the near sensor continuously tracks the instantaneous range of the object, once the distant sensor detects the object, the range of the object with respect to both the distant sensor and the near sensor is known, and so the position of the object can be triangulated. Once the velocity of the object is determined, the angle of impact can be determined based on the normal component of the velocity. Having determined the angle of impact, the actual point of impact can be determined. Once it has been determined where the object will impact, if at all, a fire signal is sent prior to impact to decision device 20 which is part of an existing restraint system. A conventional g force sensor 30 sends a fire signal to decision device 20 upon impact with the object. Decision device 20 then signals passenger restraint system 32 to fire the airbag well prior to the time the "g" sensor can determine collision has occurred.

Figure 2:
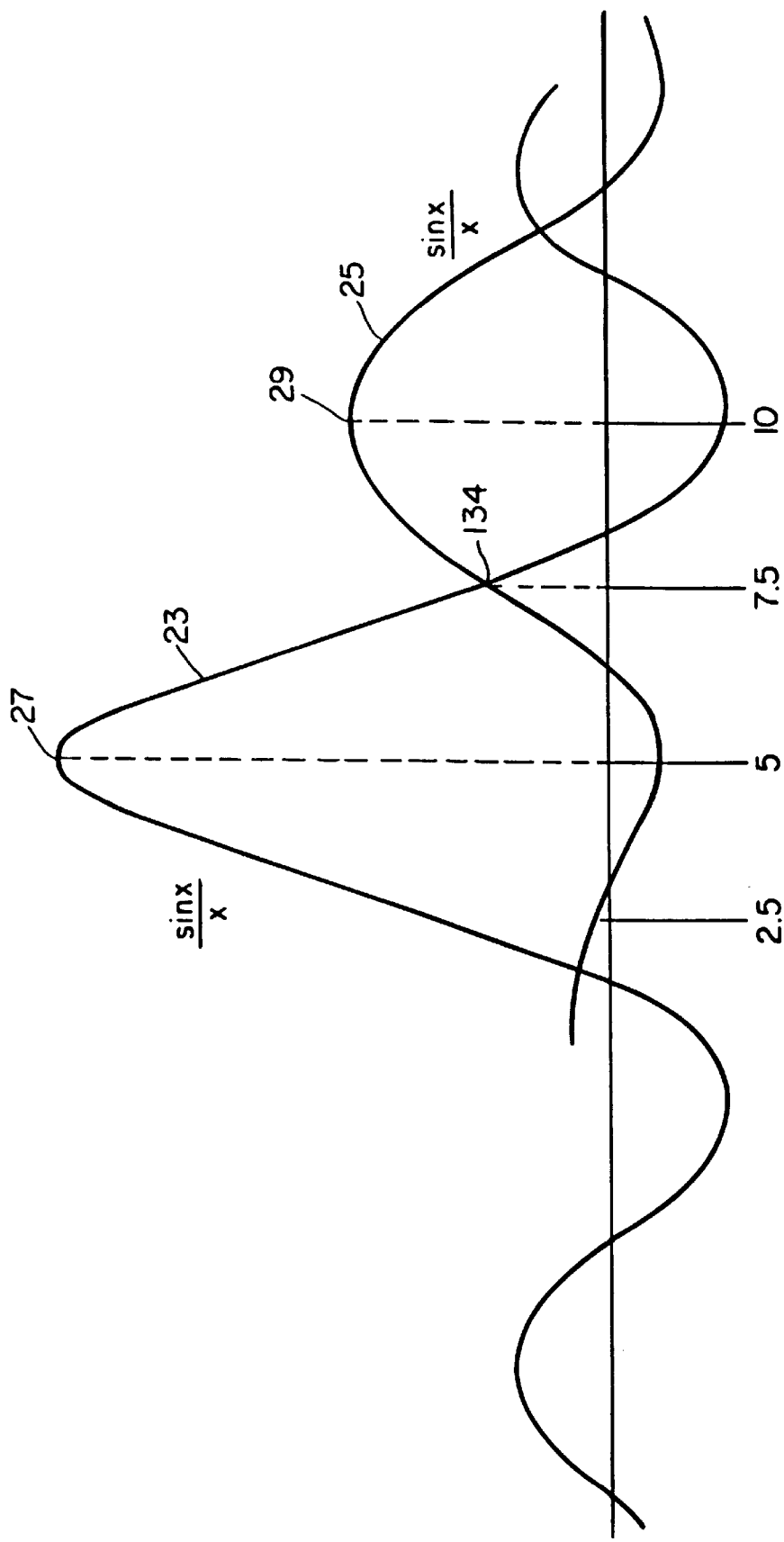
FIG. 2 is an illustrative depiction of the amplitude of the first and second harmonic components of one of the reflected modulation signals.

The actual amplitudes of the first and second harmonic components of the modulation signal are illustratively depicted by waveforms 23 and 25, respectively, FIG. 2. In a modulated carrier signal, the harmonic components of the modulation signal peak at fixed distances for a given bandwidth of the carrier signal independent of frequency. For example, in a modulated carrier signal in which the carrier signal has a bandwidth of 100 MHz, the first harmonic component 23 of the modulation signal has a peak 27 at 5 feet. Similarly, the second harmonic component 25 of the modulation signal has a peak 29 at 10 feet. The point at which the two harmonic components intersect 134 is ½ the distance between the peaks, or 7.5 feet and is known as a range bin crossing. Therefore, for a signal reflected from an object, where the amplitudes of the first and second harmonic components of the modulation signal are equal, or intersect, the instantaneous range of the object is known. The distances at which the amplitudes peak can be directly controlled by the bandwidth of the carrier signal. For example, a carrier signal having a bandwidth of 200 MHz would have a first harmonic component of the modulation signal peak at 2.5 feet and the second harmonic component would peak at 5 feet. Thus, the range of an object can be detected based solely on the bandwidth of the carrier signal regardless of the frequency of either the carrier signal or the modulation signal. Once the instantaneous range of an object is determined, the instantaneous range of the object can be tracked by counting the Doppler pulses from that point on: at 5.8 GHz each Doppler cycle represents the relative movement of the object in one inch increments. The range detected is the radial distance from the sensor. It should be noted that the intersection may be adjusted as well by introducing delay in the system or amplifying the signals.

Figure 3:
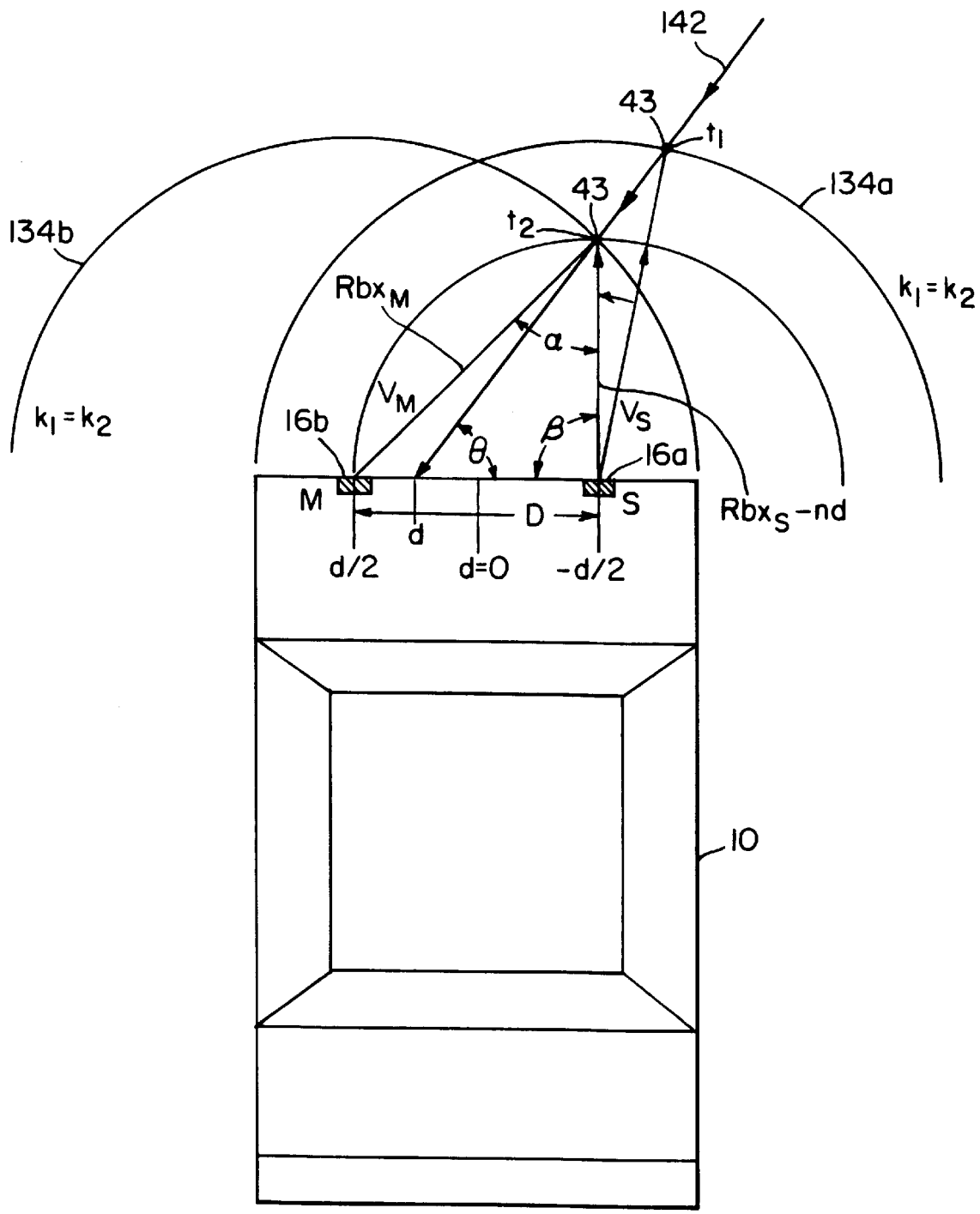
FIG. 3 is a top plan schematic view of an automobile equipped with a master sensor and a slave sensor and an object on a collision course with the automobile in which the object is first detected by the slave sensor.
Figure 4:
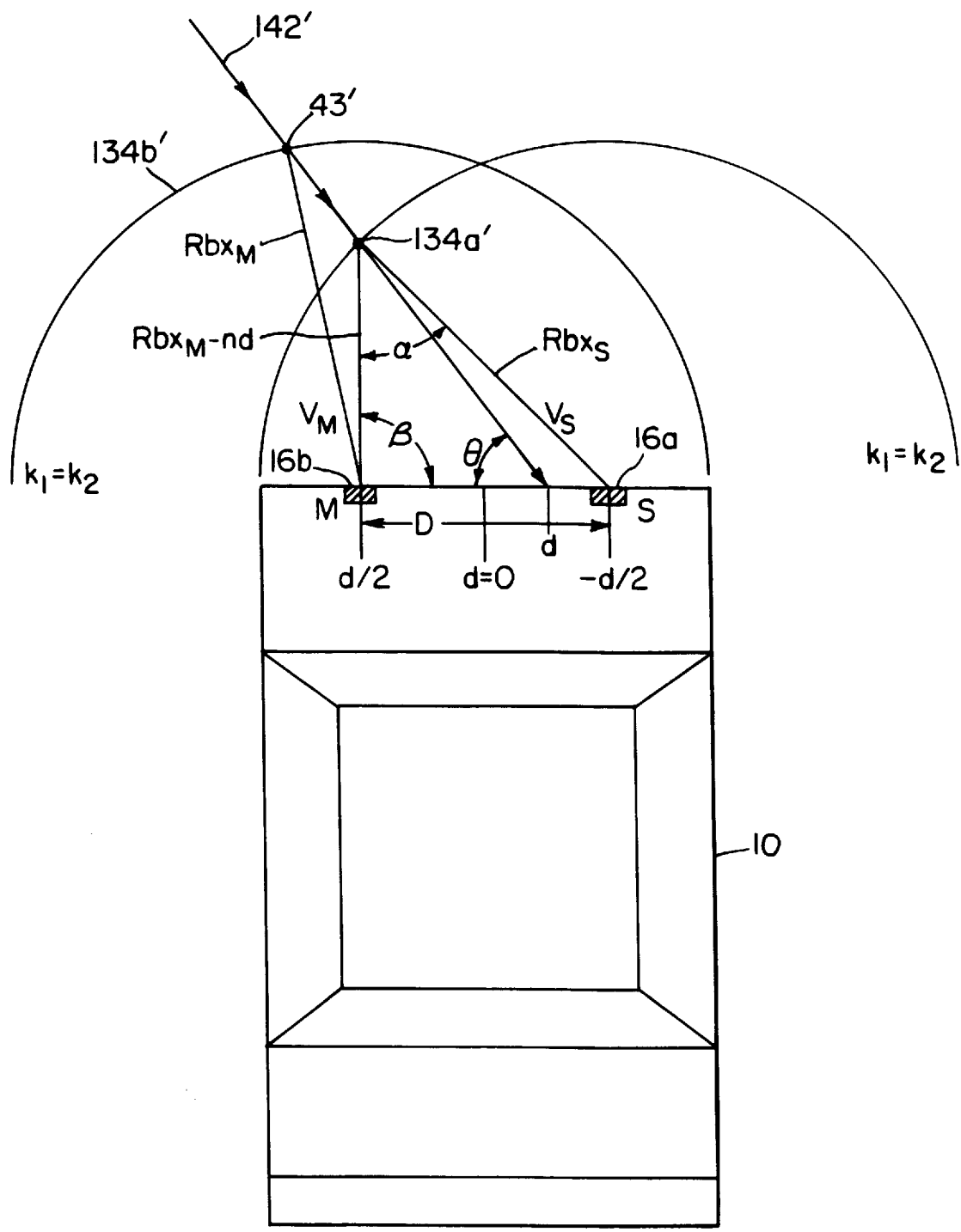
FIG. 4 is a view similar to FIG. 3 in which the object is first detected by the master sensor.

The manner of triangulating the position of a colliding object can be understood more clearly by referring to FIG. 3 and FIG. 4. By detecting two known ranges of an object it is possible, using simple trigonometry, to determine where and when, if at all the object will impact the vehicle. A first range bin crossing and a second range bin crossing are detected, both known distances. The first range bin crossing yields the range of the object with respect to one sensor. The second range bin crossing yields the range of the object with respect to the second sensor. Subtracting from the first range bin crossing the distance travelled to the second range bin crossing yields the range of the object with respect to the first sensor at a time when the range of the object with respect to the second sensor is also known. Thus, knowing the range of the object with respect to two sensors separated by a fixed distance permits an oblique triangle to be defined. The use of simple trigonometry yields the angle formed by the headings of the object to each sensor and the angle formed by the heading of the object to the first sensor and the vehicle. Knowing the relative velocity of the object with respect to each sensor (as measured by each sensor) and using the angles found above, the normal component of the velocity of the object with respect to the vehicle is determined. The angle at which the object will impact the vehicle is found, again using simple trigonometry, using the normal and tangential components of the velocity of the object. Finally, once the angle of impact is known, the point of impact is determined. Typically, an object will be detected by one sensor before it is detected by the other sensor.

An automobile 10, FIG. 3, is equipped with a first sensor 16a which acts as a slave and a second sensor 16b which acts as a master. An object is detected first by the slave sensor. The master sensor performs the same calculations as the slave plus it performs oversight and control functions regardless of which sensor detects the object first. The sensor which detects an object first determines which calculation software is accessed. Arcs 134a and 134b represent the range bin crossing: the point at which the Doppler of the first and second harmonic components of the reflected modulated signal associated with sensors 16a and 16b, respectively, intersect, as discussed in FIG. 2. As discussed above, this distance is a known distance and is the same for both sensors. It can be varied but is typically set to 4.5 feet and is based on the standard width of an automobile. The range of each sensor is chosen so that it is just beyond the distant edge of the bumper.

An object 43 traveling along a path 142 is first detected by first sensor 16a. When crossing 134a is detected by first sensor 16a, the instantaneous range of object 43 is known. When the first sensor detects a range bin crossing, it sends an 8 bit word to second sensor 16b. This informs second sensor 16b that a crossing 134a has occurred. The first sensor 16a then sends a 16 bit word to the second sensor for every Doppler pulse received. The 16 bit word contains the captured counter value, discussed in greater detail in FIG. 5. As the object 43 continues along path 142, range determining device 22, FIG. 1, counts the Doppler pulses associated with the reflected modulation signal received by first sensor 16a. The second sensor 16b increments a variable counter for every 16 bit word received from first sensor 16a. When the second sensor 16b detects crossing 134b, it is known how many Doppler pulses it has received, and therefore can determine the radial distance that the object has traveled with respect to first sensor 16a. When second sensor 16b detects crossing 134b, velocity measurement device 26, FIG. 1, calculates the velocity of the object 43 relative to the second sensor 16b. Microprocessor 94a, FIG. 5, simultaneously calculates the velocity relative to sensor 16a using the 16 bit captured counter value received from sensor 16a. The first sensor 16a waits a confirmation distance and sends a "1" to second sensor 16b to confirm that a collision is imminent.

At this point, the radial distance, or headings, from the object 43 to second sensor 16b and first sensor 16a form an angle α. The distance from second sensor 16b to the object 43 is known from the crossing 134b, as discussed in FIG. 2, and the distance D between the two sensors is known. The distance from the object 43 to first sensor 16a determining device from the distance to crossing 134a. Each Doppler pulse is equivalent to ½ of a Doppler cycle, or ½ inch at 5.8 GHz, thus, dividing by 2 yields a full Doppler cycle, or 1 inch. Knowing the length of all three sides of the oblique triangle, it is possible to determine β and α using equations 1 and 2 below:

$$\beta = \cos^{-1}\left[\frac{(rbx-nd)^2 + D^2 - rbx^2}{2D(rbx-nd)}\right] \quad (1)$$

$$\alpha = \sin^{-1}\left[\frac{D\sin(\beta)}{rbx}\right] \quad (2)$$

where:

rbx=range bin crossing (typically 4.5 ft. or 53 inches)

D=distance between the sensors (inches)

nd=number of Doppler cycles (inches)

The velocity of the object 43 relative to first sensor 16a, or slave, can be found by:

$$v_s = v_x \sin(\beta) - v_y \cos(\beta) \quad (3)$$

Similarly, the velocity relative to second sensor 16b, or master, can be found by:

$$v_m = v_x \sin(\alpha+\beta) - v_y \cos(\alpha+\beta) \quad (4)$$

However, these velocities are known since they are measured by each sensor as discussed in FIG. 3. Solving for $v_x$ and $v_y$ yields:

$$v_x = \frac{v_m \cos(\beta) - v_s \cos(\alpha+\beta)}{\sin(\alpha+\beta)\cos(\beta) - \sin(\beta)\cos(\alpha+\beta)} \quad (5)$$

$$v_y = \frac{v_x \sin(\beta) - v_s}{\cos(\beta)} \quad (6)$$

Having found $v_x$ and $v_y$, the normal component of the velocity, the angle of impact $\theta$ can be found as follows:

$$\theta = \cos^{-1}\left[\frac{v_y}{v}\right] \text{ where } v = \sqrt{v_x^2 + v_y^2} \quad (7)$$

Finally, the actual point of impact, d, is determined by:

$$d = \frac{(rbx-nd)(\sin(\pi-\theta-\beta))}{\sin\theta} - \frac{D}{2} \quad (8)$$

where:

rbx=range bin crossing (inches)

nd=number of full Doppler cycles (inches)

D=distance between the sensors

If the collision is directly at the center of the vehicle, the collision point (d) is zero. If the collision is towards the second sensor, the offset distance is positive and likewise, if the collision is closer to the first sensor then d is negative. All of the above calculations may be calculated by the microprocessor. However, this not only adds to the cost and complexity of the microprocessor, but adds to the time necessary to perform the calculations. Reducing this time could be accomplished, but again, would add to the cost of the microprocessor. Given the standard width of an automobile is typically 4.5–5.0 feet, there are only a finite number points at which an object may impact the front bumper. By choosing a fixed number of points, it is possible to develop a lookup table such that for a given normal component of the velocity $v_y$ and angle of impact $\theta$, the point of impact along the front bumper can be readily determined. In the preferred embodiment only forty four points are used to develop the table. However, this is not a critical number. Using a lookup table forgoes the need for a complex microprocessor to perform the calculations discussed above. Thus, the impact information can be readily obtained as an object is detected without a sophisticated or expensive microprocessor. If first sensor 16a does not confirm the collision, it sends a "2" to second sensor 16b indicating that no collision is imminent. If both sensors do not confirm an imminent collision, the system resets and continues to monitor for potential colliding objects, waiting to detect crossings 134a or 134b. If either sensor confirms, a collision is imminent.

Another mode of operation, is when the second sensor 16b detects an object first. Referring now to FIG. 4, there is shown in an automobile 10 equipped with a first sensor 16a which still acts as a slave and a second sensor 16b which still acts as a master. Arcs 134a' and 134b' represent the range bin crossings as discussed in FIG. 3. An object 43' traveling along a path 142' is first detected by second sensor 16b. When crossing 134b' is detected by second sensor 16b, the instantaneous range of object 43' is known. As the object 43' continues along path 142', range determining device 22, FIG. 1, counts the Doppler pulses associated with the reflected modulation signal received by second sensor 16b. When first sensor 16a detects crossing 134a', velocity measurement device 26, FIG. 1, calculates the velocity of the object 43' relative to the first sensor 16a. Microprocessor 94a, FIG. 5, simultaneously calculates the velocity relative to sensor 16b using the 16 bit captured counter value received from sensor 16b. At this point, the radial distance from first sensor 16a and second sensor 16b to the object 43' form an angle $\alpha$. The distance from first sensor 16a to the object 43' is known from the crossing 134a', and the distance between the two sensors D is known. The distance from the object 43' to second sensor 16b is determined by subtracting ½ the number of Doppler pulses counted by the range determining device from the distance to crossing 134b'. Knowing the length of all three sides of the oblique triangle, it is possible to determine $\beta$ and $\alpha$ using equations 9 and 10 below:

$$\beta = \cos^{-1}\left[\frac{(rbx-nd)^2 - D^2 - rbx^2}{-2Drbx}\right] \quad (9)$$

$$\alpha = \sin^{-1}\left[\frac{D\sin\beta}{(rbx-nd)}\right] \quad (10)$$

$$\theta = \cos^{-1}\left[\frac{v_y}{v}\right] \text{ where } v = \sqrt{v_x^2 + v_y^2} \quad (11)$$

The relative velocity of the object with respect to each sensor as well as $v_x$, $v_y$, and $\theta$ are found as before.

Having found $v_x$, $v_y$, and the angle of impact $\theta$, the point of impact d is found by:

$$d = \frac{rbx\sin(\pi-\theta-\beta)}{\sin\theta} - \frac{D}{2} \quad (12)$$

As discussed in FIG. 3, a look up table is used to actually determine the impact point.

Figure 5:
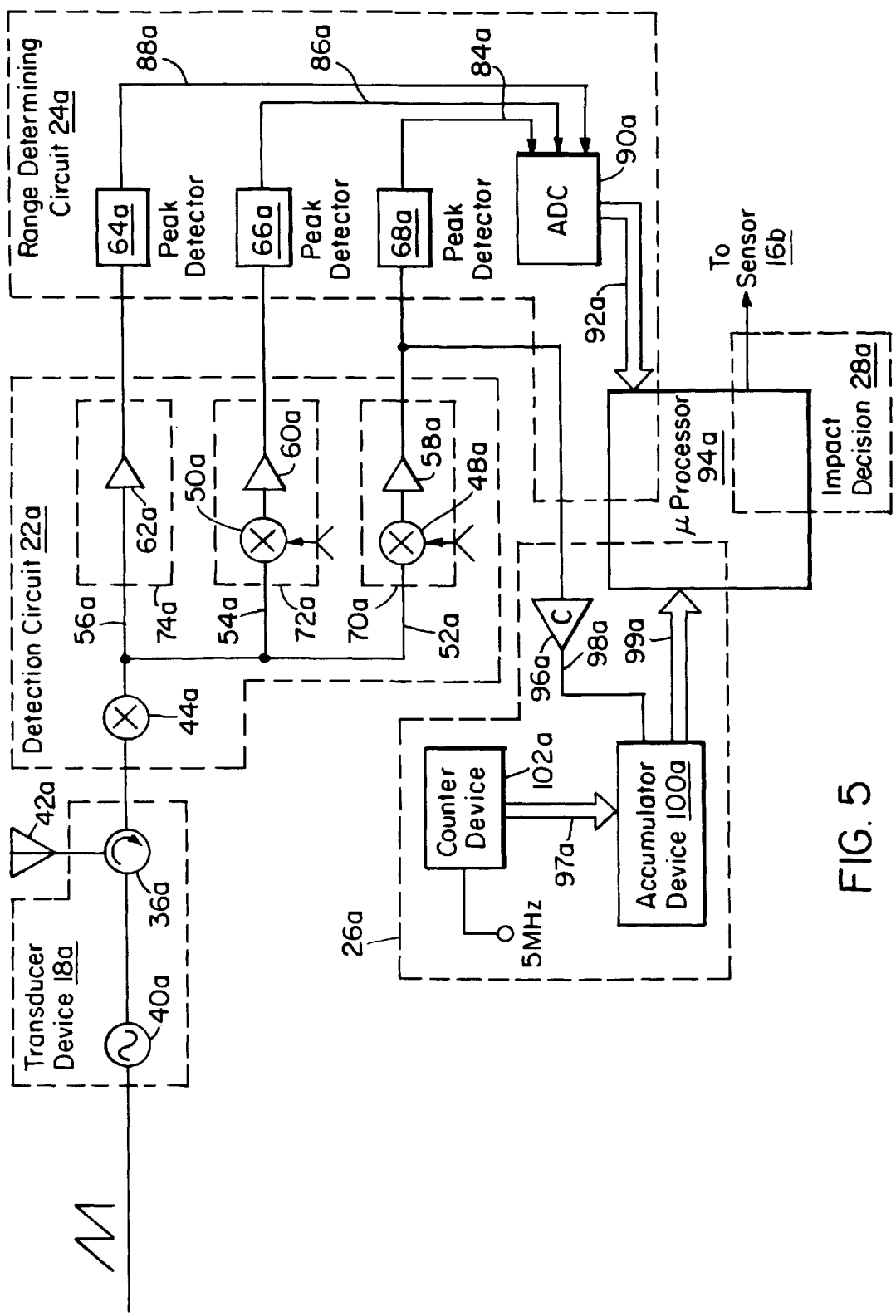
FIG. 5 is a more detailed schematic of a multi-sensor anticipatory object detection system according to this invention.

A more detailed schematic of an individual sensor is shown in FIG. 5. As each sensor is identical, the discussion of FIG. 5 will be directed to sensor 16a. In a preferred embodiment, the means of communication between the sensors is unidirectional serial communication. Slave sensor 16a communicates to master sensor 16b (not shown) which communicates to passenger restraint system 32, which in turn is connected back to sensor 16a, closing the loop. Transducer device 18a includes a voltage controlled oscillator 40a which generates a carrier signal having a center frequency of 5.8 GHz. In order to remain within FCC guidelines for unlicensed sensor operation, the bandwidth of the signal must be such that the carrier signal stays within the range of 5.725 GHz to 5.875 GHz. In this embodiment, the carrier signal is modulated at a frequency of 156.25 KHz. The frequency range, or bandwidth, of voltage controlled oscillator 40a is dictated by the changes in amplitude of the modulation signal. The modulation frequency is typically chosen to be at least ten times larger than the Doppler frequency. It must be of sufficient frequency such that leakage throughout the system will not affect the Doppler frequency. A circulator 36a delivers the modulated carrier signal to antenna 42a.

Antenna 42a transmits the modulated 5.8 GHz carrier signal, which is reflected off objects within a predetermined range, typically from two to ten feet away to just beyond the bumper. The reflected signal is then received by antenna 42a. The transducer device of the preferred embodiment is provided in a single MMIC radar chip manufactured by Hittite Corporation of Massachusetts and includes a single transmit/receive antenna. However, independent transmit and receive antennas may be used. It is important, however, that a broad beam antenna is used to provide sufficient field view of the system.

Detection circuit 22a beats the received signal with the modulated carrier signal using mixer 44a. The local oscillator for mixer 44a is provided by the leakage of the modulated carrier signal from circulator 36a. Mixer 44a produces a beat frequency, or composite Doppler signal, which is the frequency difference between the modulated carrier signal and the received reflected signal associated with sensor 16a. The composite Doppler signal is comprised of a plurality of signals to include the harmonic components of the reflected modulation frequency. The frequency of the harmonics of the modulation frequency present in the composite Doppler signal differ from the modulation frequency by the Doppler frequency.

Figure 6:
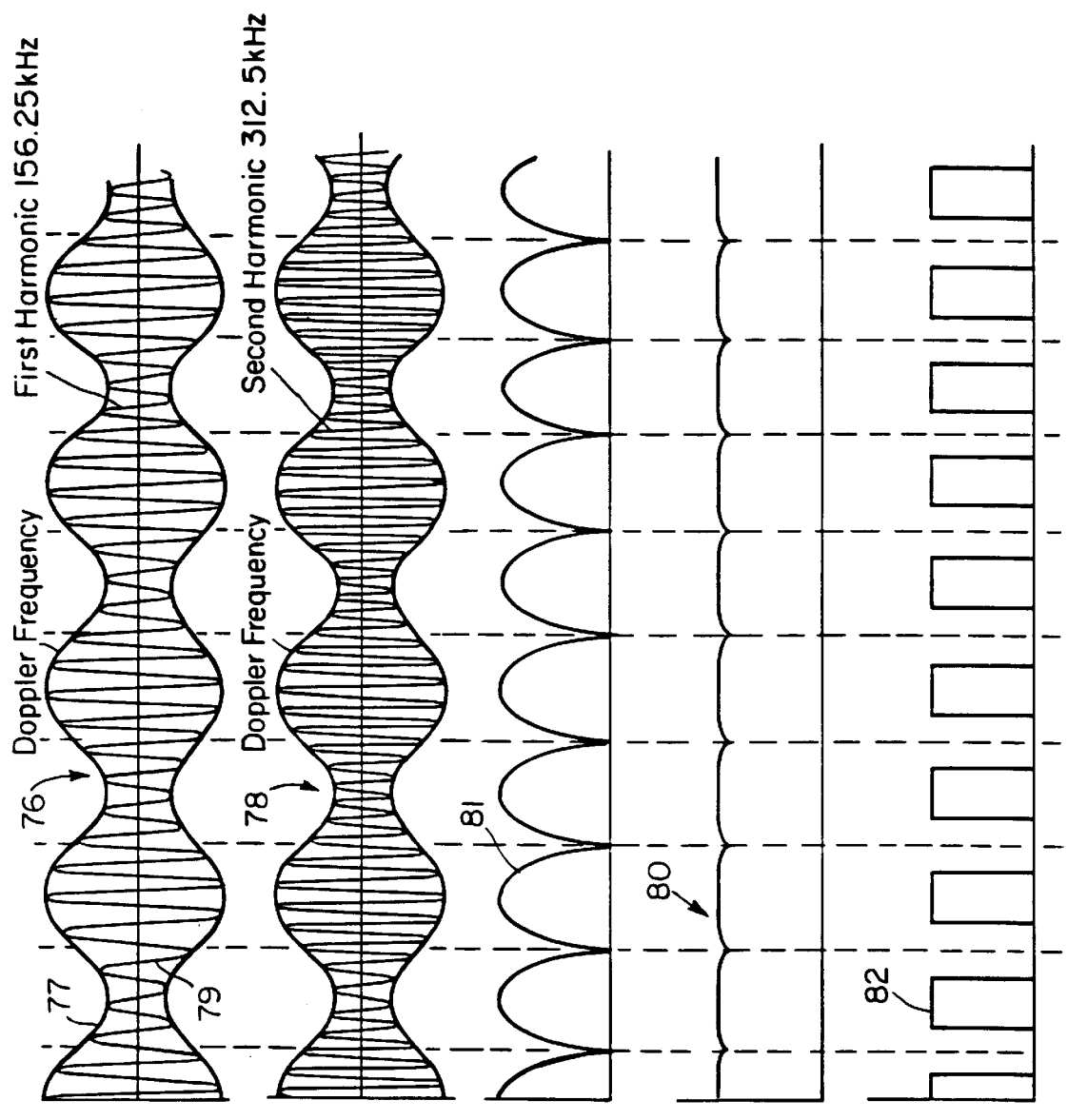
FIG. 6A is a representation of the first harmonic of the modulation signal of the Doppler signal received from a potential colliding object, the envelope of which represents the Doppler shift.
FIG. 6B is a representation of the second harmonic of the modulation signal of the Doppler signal received from a potential colliding object, the envelope of which represents the Doppler shift.
FIG. 6C is a representation of the demodulated $K^{th}$ harmonic of the Doppler frequency.
FIG. 6D is a representation of a filtered harmonic which provides a DC voltage signal of that harmonic.
FIG. 6E is a representation of the output from a comparator circuit which provides a Doppler pulse of the same frequency as the Doppler.

For purposes of this embodiment, the harmonic components of interest are the first harmonic component, second harmonic component and the DC harmonic component of the modulation signal. Detection circuit 22a contains a plurality of signal paths 52a, 54a, and 56a which deliver the Doppler shifted harmonic components to a plurality of channels 70a, 72a, and 74a respectively, for extracting the Doppler from the harmonic components. In a preferred embodiment, channel 70a contains a mixer 48a which mixes the Doppler shifted first harmonic component, represented by waveform 76 as shown in FIG. 6A, with the modulation signal, 156.25 KHz: envelope 77 represents the Doppler frequency while the first harmonic is represented by waveform 79. This demodulation extracts the Doppler of the first harmonic component of the modulation signal associated with sensor 16a, or first Doppler, the envelope of the Doppler shifted harmonic component. Channel 70a also includes a Doppler amplifier 58a which includes a pulse shaping circuit that amplifies and rectifies the first Doppler. This signal is represented by waveform 81 as shown in FIG. 6C. Thus, this signal has the frequency of the Doppler frequency and the amplitude represents the variations of the first harmonic component of the modulation signal of the reflected signal. The Doppler amplifier 58a supplies the amplified, rectified, first Doppler to a range determining circuit 24a. Range determining circuit 24a includes a peak detector 68 which includes an RC network which produces a DC voltage as illustrated by waveform 80 in FIG. 6D.

In a similar manner as channel 70a, channel 72a contains a mixer 50a which mixes the Doppler shifted second harmonic component, represented by waveform 78 as shown in FIG. 6B, with a signal which is twice the frequency of the modulation signal, 312.5 KHz. This demodulation produces the Doppler of the second harmonic component, or second Doppler, of the modulation signal. Channel 72a also contains Doppler amplifier 60a which includes a pulse shaping circuit that amplifies and rectifies the second Doppler. This signal is similar to that illustrated by waveform 81 in FIG. 6C. The amplified, rectified second Doppler is then delivered to range determining circuit 24a. Range determining circuit 24a includes a peak detector 66a, similar to peak detector 68a, which produces a DC voltage output similar to that illustrated by waveform 80 of FIG. 6D.

Channel 74a includes a Doppler amplifier 62a which amplifies and rectifies the Doppler signal to produce the Doppler of the direct current (DC) or fundamental harmonic component, or DC Doppler, of the reflected modulation signal. The DC Doppler is delivered to peak detector 64a, similar to peak detectors 66a and 68a, to produce a DC voltage similar to waveform 80 of FIG. 6D.

The DC voltage signals of the first Doppler, second Doppler, and DC Doppler are delivered to an analog to digital converter 90a via signal paths 84a, 86a and 88a respectively. Analog to digital converter 90a converts the DC voltages to digital signals which it then supplies to a microprocessor 94a via signal bus 92a. Microprocessor 94a, through the implementation of software discussed below, monitors the Doppler amplitude of each harmonic component and its relationship with the Doppler amplitudes of the other harmonic components to determine the instantaneous range of an object. The instantaneous range is determined using intersection of the first and second Doppler amplitudes. The amplitude, phase, and relative Doppler sideband character of each of the harmonic components are a function of object range, relative velocity magnitude and sense, and peak to peak frequency deviation. Once a predetermined relationship between the harmonics is detected, microprocessor 94a sends a signal to sensor 16b and enables velocity measurement circuit 26a to determine the instantaneous velocity of the object.

Velocity measurement circuit 26a includes a comparator device 96a. In one embodiment, comparator 96a is connected to the output of channel 70a of detection circuit 22a since the first harmonic component has the greatest amplitude. However, comparator 96a may be placed at the output of either channel 72a or 74a. Comparator 96a receives the amplified, rectified first Doppler and compares the level of that output to a predetermined value. If the level of the input exceeds a predetermined value, comparator 96a outputs a high signal. If the input does not exceed the predetermined value, comparator 96 outputs a low value. The resulting output, a series of Doppler pulses illustrated by waveform 82 as shown in FIG. 6E, is delivered over signal path 98a to velocity measurement circuit 26a. Velocity measurement circuit 26a includes a velocity measurement circuit having an accumulator device 100a, such as a capture register, which is driven by the Doppler pulse supplied over signal path 98a. Velocity measurement circuit 26a also includes a counter device 102a interconnected with accumulator device 100a via signal bus 97a. Counter device 102a, driven by an internal 5 MHz clock, continuously counts the cycles of the 5 MHz clock. With every rising edge of the Doppler pulse from comparator 96a, accumulator device 100a sends an interrupt to microprocessor 94a, a portion of which is shared with range determining circuit 24a, and simultaneously reads counter device 102a and stores the number of cycles counted. With every interrupt received by microprocessor 94a from accumulator device 100a microprocessor 94a reads the cycle count stored in accumulator device 100a, resets counter device 102a and increments a Doppler count by 1. The Doppler count represents the number of Doppler pulses received. Thus, velocity measurement circuit 26a counts the number of 5 MHz clock pulses that occur for each Doppler pulse. Since the Doppler pulse is derived from a rectified Doppler component, each pulse represents one half Doppler cycle. The process is repeated with each rising edge of the Doppler pulse, each 5 MHz cycle count being added to the previous cycle count stored in microprocessor 94*a*, until the Doppler count is equal to 4. Once the Doppler count equals 4, the microprocessor 94*a* discontinues reading accumulator device 100*a* and divides by 4 the total count stored to provide an average 5 MHz cycle count. Microprocessor 94*a* then refers to a look up table to determine what velocity is associated with that average count. While there are many ways the velocity may be calculated, the look up table provides a fast and accurate method without tying up the microprocessor. Accumulator device 100*a* continues to send an interrupt to microprocessor 94*a* with every rising edge of the Doppler pulse. Although the microprocessor no longer reads accumulator device 100*a*, with every interrupt it receives from accumulator device 100*a*, microprocessor 94*a* continues to increment the Doppler count and sends a signal to sensor 16*b*. The Doppler count represents the number of Doppler pulses received, each pulse being equivalent to 0.5 inches of relative movement by the object; each Doppler cycle is one half the wavelength of the 5.8 GHz carrier signal. Thus, once the intersection of the first and second Doppler is detected, giving an instantaneous range of the object, the object's range thereafter can be tracked by counting the Doppler pulses reflected from the object.

While the velocity is being determined, microprocessor 94*a*, a portion of which is included in an impact decision circuit 28*a*, continues to monitor the amplitude of the Doppler. When impact decision circuit 28*a* has determined that a collision is imminent, a signal is sent to sensor 16*a* (not shown). In the preferred embodiment microprocessor 94*a*, analog to digital converter 90*a*, counter device 102*a* and accumulator device 100*a* are contained in a single chip, Model PIC16C74, available from Microchip of Chandler, Ariz.

Figure 7:
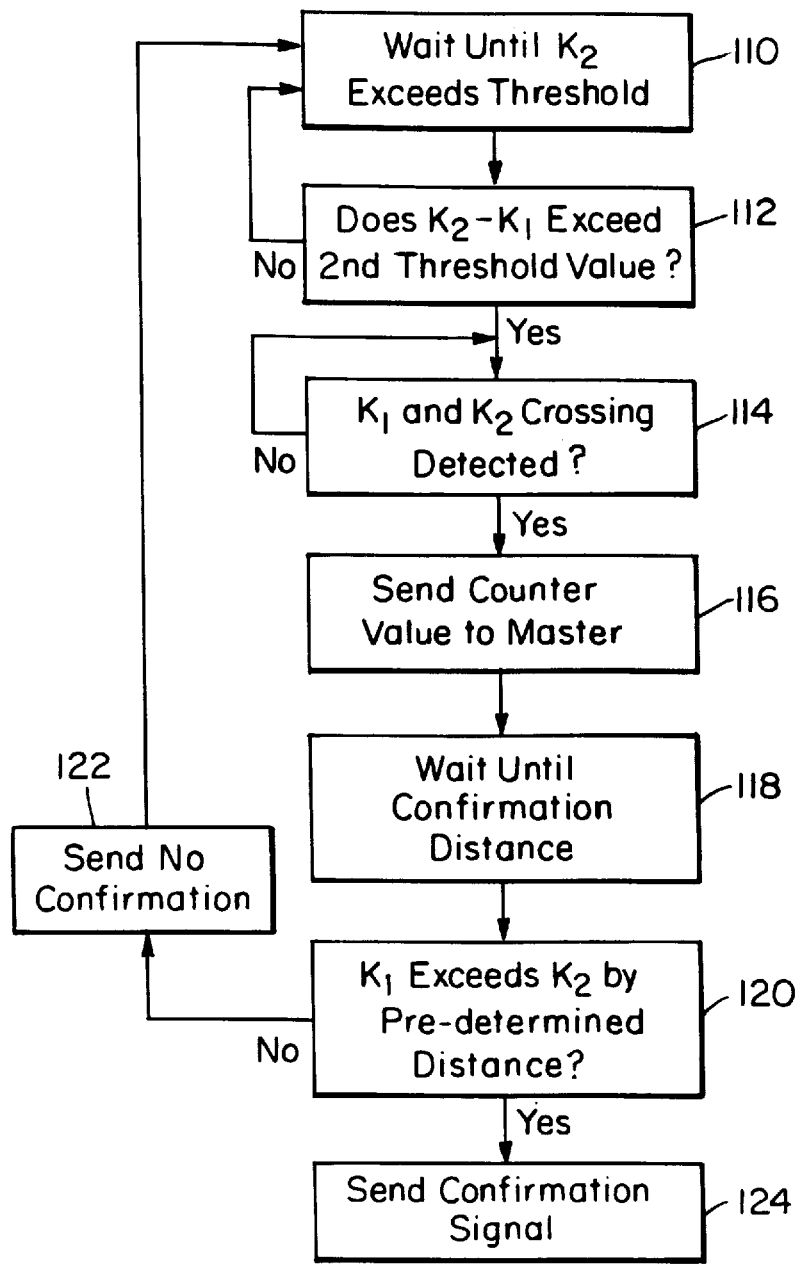
FIG. 7 is a flow chart of the algorithm used by the range determining device to monitor the amplitude of the Doppler in the first and second harmonic components of the modulation signal of the Doppler signal to determine that a collision is imminent.

The software implemented by the slave sensor to monitor the Doppler amplitudes of the harmonic components is illustrated by the flow chart of FIG. 7. In block 110 microprocessor 94*a*, FIG. 5, monitors the amplitude of the second Doppler, K2, to determine when it exceeds a predetermined threshold value. Once this threshold value has been exceeded the microprocessor monitors the difference between K2 and the amplitude of the first Doppler, K1, to determine whether that difference exceeds a second threshold value, block 112. If that second threshold value is not exceeded, the software returns to block 110 continuing to monitor K2. However, if the difference between the two harmonic components exceeds the second threshold value, microprocessor 94*a*, FIG. 5, monitors K2 and K1, to detect when K1 equals K2, block 114, at which point the instantaneous range of the object is known. If K1 equals K2, block 114, microprocessor 94*a*, FIG. 5, sends the 16 bit counter value captured by the accumulator from the counter device to the master sensor, block 116. The microprocessor of the slave sensor waits for a confirmation distance, block 118. This confirmation distance is determined by counting the Doppler pulses, each pulse translating to 0.5 inches of relative movement, from the intersection of K1 and K2 where the range is known. Once that confirmation distance has been achieved, the K1 and K2 components are compared to determine whether the K1 component exceeds K2 by a predetermined difference, block 120, which difference represents the difference that would occur in an actual collision given the same velocity. If that difference is detected, a signal is sent to sensor 16*b*. If K1 does not exceed K2 by a predetermined difference, block 120, a no confirmation signal is sent, block 122, which indicates that no collision will occur, and the slave microprocessor returns to monitoring K2, block 110. Note that the master sensor monitors the harmonics in a similar fashion once a range bin crossing has been detected, except that the master communicates directly with the passenger restrain system. For example, rather than send confirmation information the master sends a fire signal, or a no fire signal.

Figure 8:
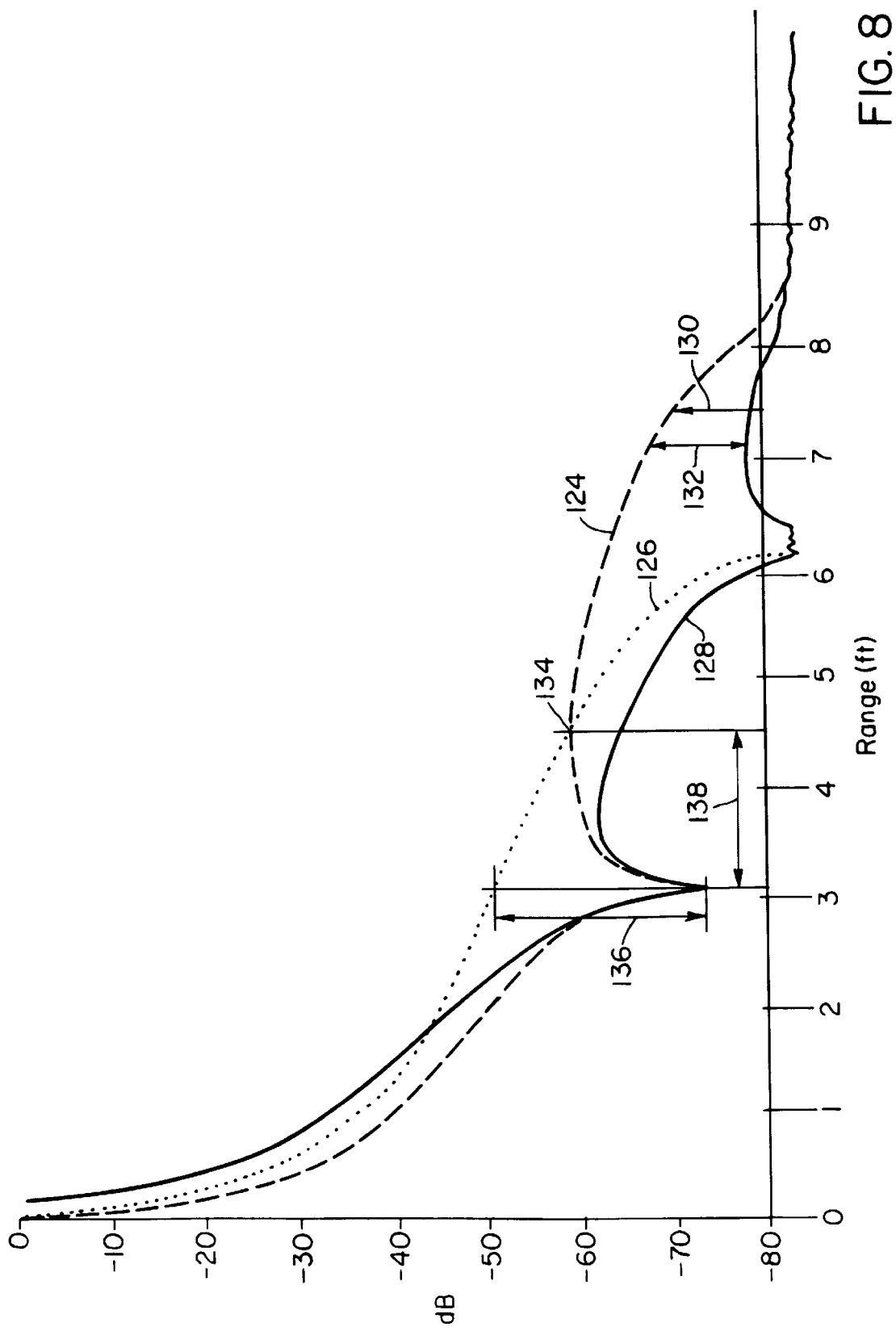
FIG. 8 is a graphic representation of the typical variation of amplitudes with respect to range of the Doppler in the first, second and DC harmonic components relative to each other.

An example of the Doppler amplitudes each microprocessor is looking for is illustrated in FIG. 8. When the amplitude of the second Doppler 124 exceeds a predetermined threshold value 130 the microprocessor monitors the difference between the amplitudes of the second Doppler 124 and the first Doppler 128 until there is detected a second threshold value 132, which represents the predetermined difference. Once this second threshold value 132 is detected, the microprocessor monitors the amplitude of the second Doppler 124 and the amplitude of the first Doppler 126 to detect when the amplitudes are equal. This is represented by crossing 134. Once crossing 134 has been detected, the microprocessor monitors the amplitude of the second Doppler 124 and the amplitude of the first Doppler 126 for a confirmation distance 138. This confirmation distance is generally equal to the distance from the sensor system to just beyond the edge of the automobile. Once the microprocessor has waited for the confirmation distance 138 it compares the amplitude of the second Doppler 124 with the amplitude of the first Doppler 126 looking for a predetermined difference 136 which represents the difference which would occur in an actual collision. When predetermined difference 136 has been detected at the confirmation distance 138, microprocessor 94, FIG. 5, determines that a collision is imminent and sends a confirmation signal.

It should be noted that amplification of the Doppler components can be used to vary their relationships with each other and thus shift crossing 134 to a desired distance as well as confirmation distance 138. This simple gain adjustment using amplifiers 58*a*–62*a* provides a degree of freedom for various pre-crash sensing applications where a single sensor is mounted in the center of a bumper of the automobile. Because the typical width of an automobile is 4 to 5 feet, the decision must be made just beyond the edge of the automobile so as not to induce false alarms. Thus, the system can be easily adapted for any size automobile.

Figure 9:
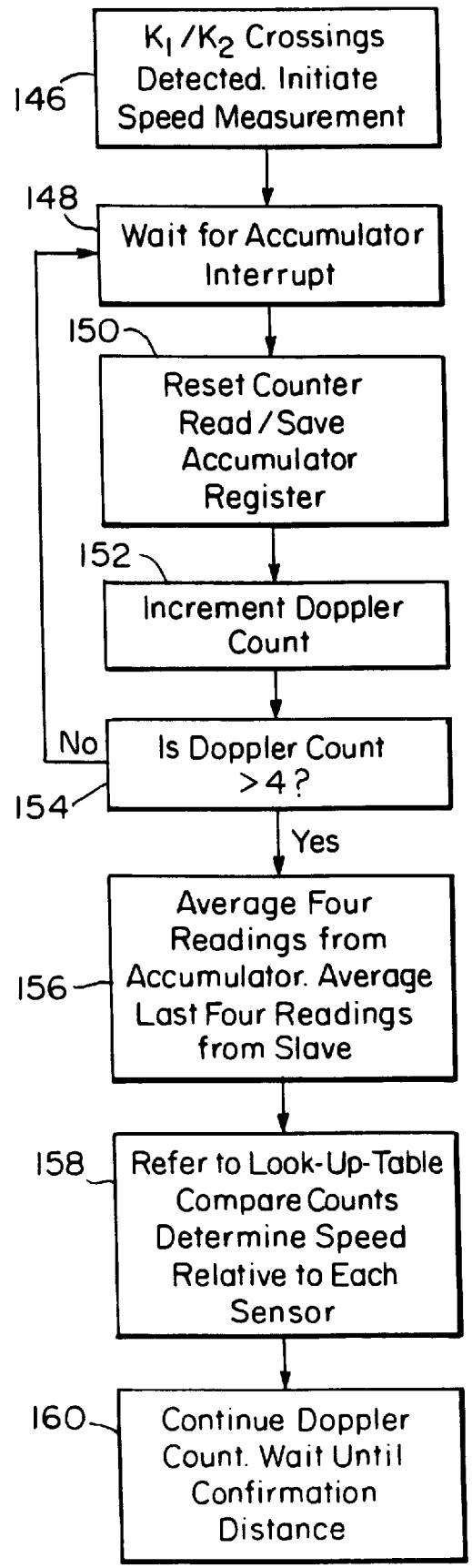
FIG. 9 is a flow chart of the velocity measurement steps taken by the velocity measurement device according to this invention.

Once crossing K1, K2 has been detected by both the master and slave sensors, the speed calculation is initiated, block 146, FIG. 9. The microprocessor of the master sensor waits for an accumulator interrupt, block 148, and resets the counter saving the accumulator value, block 150. A Doppler count is incremented, block 152, and compared to determine whether it is greater than four, block 154. If the Doppler count does not exceed four the routine returns to block 148 and waits for the next interrupt. However, if the Doppler count is greater than four, the microprocessor divides by four the total number of 5 MHz cycles counted to obtain an average clock cycle over four readings of the 5 MHz clock, block 156. The microprocessor simultaneously averages the last four 16 bit words received from the slave sensor to obtain an average count with respect to the slave sensor. The microprocessor compares each average clock cycle count to a lookup table to determine the relative velocity of the object with respect to each sensor, block 158. The microprocessor discontinues reading the accumulator device, but increments the Doppler count with each interrupt received from the accumulator counting Doppler pulses until the confirmation distance has been reached, block 160.

Figure 10:
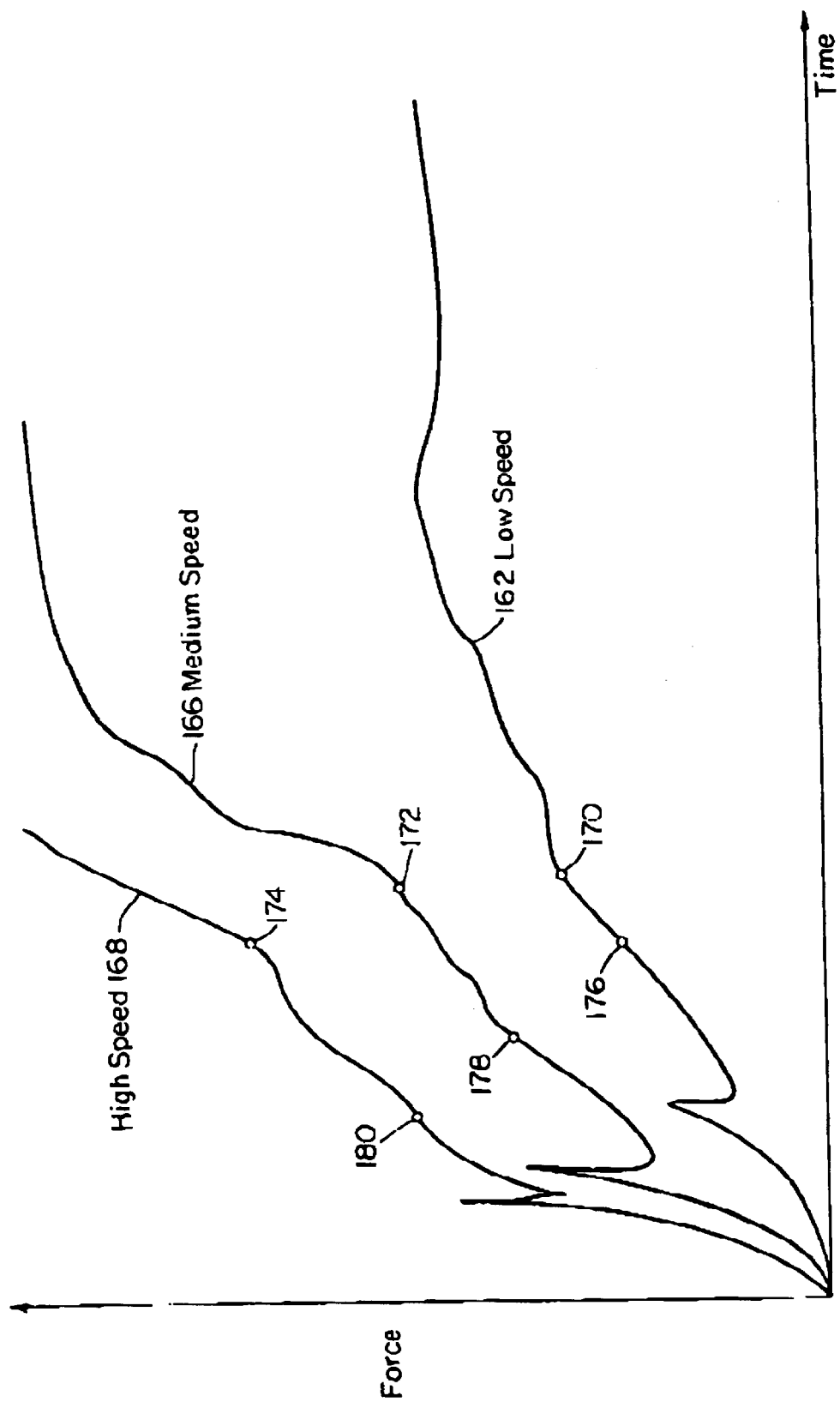
FIG. 10 is a graphic representation of g force sensor signals for low, medium and high speed collisions illustrating the various firing points that could be chosen sooner after impact with the anticipatory object detection system of this invention compared to firing points based on actual collision with the object.

A graphic representation of g force sensor signals for low speed 162, medium speed 166, and high speed 168 collisions based on empirical data of actual crashes can be seen in FIG. 10. Firing points 170, 172 and 174 correspond to typical points during a crash event at which the g sensor will send a fire signal to the passenger restraint system for low speed 162, medium speed 166, and high speed 168 collisions, respectively, based on the g forces the automobile is actually undergoing. In contrast, firing points 176, 178 and 180 represent the firing points for low speed 162, medium speed 166 and high speed 168 collisions as determined by the anticipatory collision sensor system according to this invention. For example, because a collision can be anticipated and determined to be imminent the passenger restraint system may fire at a point 176 which is much earlier in the crash event than the typical firing point 170 as determined by the g force sensor. In other words, whereas the g force sensor cannot determine the severity of the collision until a point in time 170 as a crash occurs, the anticipatory collision sensor system can determine the severity of the collision, based on the relative velocity of the object, at a point in time 176 before the collision takes place. This reduces the time to fully deploy the airbag, thereby allowing full deployment of the airbag before the occupants have shifted position due to the collision. This allows the passenger to remain at a safer distance from the airbag as it inflates. This also permits variable inflation rates of the airbag, while allowing it to inflate sufficiently in time to restrain the occupants. It should be noted that firing points 176, 178 and 180 are based on the relative velocity of the object and the distance of the object and are not arbitrary firing points.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A multi-sensor anticipatory object detection system for detecting the instantaneous range, relative velocity, collision angle and point of impact of a colliding object comprising:
    a plurality of transducer devices spaced a fixed distance in which each said transducer device transmits a modulated carrier signal and receives the reflected modulated carrier signal from an object;
    a detection device for detecting a plurality of Doppler shifted harmonic components from each said reflected signal;
    a range determining device, responsive to the amplitudes of said harmonic components, for determining the instantaneous range of said object from each said transducer device;
    a velocity measurement device, responsive to the frequency of said harmonic components, for determining the relative instantaneous velocity of said object; and
    an impact decision device, responsive to said range determining device and said velocity measurement device, for determining where, if at all, impact on the vehicle with said object will occur and the angle of said impact prior to impact with said object.

2. The multi-sensor anticipatory object detecting system of claim 1 in which said plurality of transducer devices includes at least a first transducer device for receiving a first reflected modulated carrier signal having a first modulation signal and a second transducer device for receiving a second reflected modulated carrier signal having a second modulation signal.

3. The multi-sensor anticipatory object detection system of claim 2 in which said velocity measurement device includes:
    a first velocity measurement circuit, responsive to the frequency of said first modulation signal for determining a first relative velocity between said object and said first transducer device; and
    a second velocity measurement circuit, responsive to the frequency of said second modulation signal, for determining a second relative velocity between said object and said second transducer device.

4. The multi-sensor anticipatory object detection system of claim 3 in which said first velocity measurement circuit includes a first comparator device, responsive to one of said plurality of harmonic components of said first modulation signal, for providing a first Doppler pulse each time the amplitude of said harmonic component exceeds a predetermined level for monitoring said first relative velocity between said object and said first transducer device.

5. The multi-sensor anticipatory object detection system of claim 4 in which said second velocity measurement circuit includes a second comparator device, responsive to one of said plurality of harmonic components of said second modulation signal, for providing a second Doppler pulse each time the amplitude of said harmonic component exceeds a predetermined level for monitoring said second relative velocity between said object and said second transducer device.

6. The multi-sensor anticipatory object detection system of claim 5 in which said range determining device includes first detection means, responsive to the amplitudes of the harmonic components of said first modulation signal, for detecting the occurrence of a first predetermined relationship between said harmonic components to determine a first range of said object from said first transducer device.

7. The multi-sensor anticipatory object detection system of claim 6 in which said range determining device further includes second detection means, responsive to the amplitudes of the harmonic components of said second modulation signal, for detecting the occurrence of a second predetermined relationship between said harmonic components to determine a second range of said object from said second transducer.

8. The multi-sensor anticipatory object detection system of claim 7 in which said impact decision device includes counting means, responsive to said occurrence of said first predetermined relationship, for counting said first Doppler pulses until said occurrence of said second predetermined relationship for indicating a third range of said object from said first transducer device.

9. The multi-sensor anticipatory object detection system of claim 8 in which said impact decision device further includes a calculation device, said calculation device including first calculation means, responsive to said second range, said third range and said fixed distance, for determining the angle between said automobile and the heading of said object to said first transducer device.

10. The multi-sensor anticipatory object detection system of claim 9 in which said calculation device further includes second calculation means, responsive to said first calculation means, for determining the angle between the heading of said object to said second transducer device and said heading to said first transducer device.

11. The multi-sensor anticipatory object detection system of claim 10 in which said calculation device further includes third calculation means, responsive to said first relative velocity, said second relative velocity, said first calculation means and said second calculation means, for determining the velocity of said object relative to said automobile, said velocity including a normal component and a tangential component.

12. The multi-sensor anticipatory object detection system of claim 11 in which said calculation device further includes fourth calculation means, responsive to said third calculation means, for determining said angle of impact.

13. The multi-sensor anticipatory object detection system of claim 12 in which said calculation device further includes fifth calculation means, responsive to said third range, said first calculation means, said angle of impact and said fixed distance, for determining said point of impact.

14. The multi-sensor anticipatory object detection system of claim 7 in which said impact decision device includes a calculation device, responsive to said occurrence of said first predetermined relationship and said occurrence of said second predetermined relationship for determining the point of impact of said object.

15. The multi-sensor anticipatory object detection system of claim 14 in which said calculation device includes means, responsive to said first relative velocity and said second relative velocity, for determining the normal component of said relative instantaneous velocity of said object.

16. The multi-sensor anticipatory object detection system of claim 15 in which said calculation device further includes means, responsive to said normal component, for determining the angle of said impact.

17. The multi-sensor anticipatory object detection system of claim 16 in which said calculation device further includes impact means, responsive to said angle of impact, for determining the point of said impact of said object.

18. The multi-sensor anticipatory object detection system of claim 17 in which said impact means includes a lookup table for outputting the location of said point of impact in response to said angle of impact.

19. The multi-sensor anticipatory object detection system of claim 18 in which said first detection means includes means for detecting whether the amplitude of one of said harmonic components of said first modulation signal exceeds a predetermined threshold value and said second detection means includes means for detecting whether the amplitude of one of said harmonic components of said second modulation signal exceeds said predetermined value.

20. The multi-sensor anticipatory object detection system of claim 19 in which said first detection means further includes means for detecting when the difference in amplitude between said one of said harmonic components relative to the amplitude of another of said harmonic components of said first modulation signal exceeds a second threshold value and said second detection means further includes means for detecting when the difference in amplitude between said one of said harmonic components relative to the amplitude of another of said harmonic components of said second modulation signal exceeds said second threshold value.

21. The multi-sensor anticipatory object detection system of claim 20 in which said first predetermined relationship occurs when said one of said harmonic components equals said another of said harmonic components of said first modulation signal and said second predetermined relationship occurs when said one of said harmonic components equals said another of said harmonic components of said second modulation signal.

22. The multi-sensor anticipatory object detection system of claim 21 in which said first detection means further includes means for detecting the difference in amplitude between said one of said harmonic components and yet another of said harmonic components of said first modulation signal and said second detection means further includes means for detecting the difference in amplitude between said one of said harmonic components and yet another of said harmonic components, of said second modulation signal.

23. The multi-sensor anticipatory object detection system of claim 22 in which said first detection means includes means, responsive to one of said harmonic components of said first modulation signal, for determining the time to the occurrence of a third predetermined relationship between the amplitudes of at least two of said harmonic components of said first modulation signal.

24. The multi-sensor anticipatory object detection system of claim 23 in which said second detection means includes means, responsive to one of said harmonic components of said second modulation signal, for determining the time to the occurrence of a fourth predetermined relationship between the amplitudes of at least two of said harmonic components of said second modulation signal.

25. The multi-sensor anticipatory object detection system of claim 24 in which said impact decision device further includes means, responsive the occurrence of said third predetermined relationship and said fourth predetermined relationship, for determining that impact with said object will occur and the time of impact prior to impact with said object.

26. The multi-sensor anticipatory object detection system of claim 25 in which said one of said harmonic components of said first modulation signal is the second harmonic component and said one of said harmonic components of said second modulation signal is the second harmonic component.

27. The multi-sensor anticipatory object detection system of claim 26 in which said another of said harmonics component of said first modulation signal is the first harmonic component and said another of said harmonic components of said second modulation signal is the first harmonic component.

28. The multi-sensor anticipatory object detection system of claim 27 in which said yet another of said harmonic components of said first modulation signal is the DC component and said yet another of said harmonic components of said second modulation signal is the DC component.

29. The multi-sensor anticipatory object detection system of claim 5 in which said first velocity measurement circuit further includes:
 a first counting circuit, responsive to said first Doppler pulse, for accumulating a number of clock pulses for a period of time defined by said first Doppler pulse; and
 a first velocity calculation device, responsive to said first counting circuit, for determining said first relative velocity of said object.

30. The multi-sensor anticipatory object detection system of claim 29 in which said second velocity measurement circuit further includes:
 a second counting circuit, responsive to said second Doppler pulse, for accumulating a number of clock pulses for a period of time defined by said second Doppler pulse; and
 a second velocity calculation device, responsive to said second counting circuit, for determining said second relative velocity of said object.

31. The multi-sensor anticipatory object detection system of claim 30 in which said range determining device further includes a counter device, responsive to said first counting circuit, for counting said first Doppler pulse for a predetermined period of time after said occurrence of said first predetermined relationship for indicating the instantaneous distance between said first transducer device and said object.

32. The multi-sensor anticipatory object detection system of claim 31 in which said range determining device further includes a counter device, responsive to said second counting circuit, for counting said second Doppler pulse for a predetermined period of time after said occurrence of said second predetermined relationship for indicating the instantaneous distance between said second transducer device and said object.

33. The multi-sensor anticipatory object detection system of claim 1 in which each said transducer device includes a voltage controlled oscillator for producing a carrier signal, a modulation circuit for generating a modulation signal and mixing means for mixing said carrier signal and said modulation signal to provide said modulated carrier signal.

34. The multi-sensor anticipatory object detection system of claim 33 in which said carrier signal has a bandwidth of 100 MHz.

35. The multi-sensor anticipatory object detection system of claim 34 in which said detection device includes a plurality of channels, each said channel extracting one of a plurality of harmonic components from each said modulation signal.

36. The multi-sensor anticipatory object detection system of claim 35 in which each of said plurality of channels includes a pulse shaping circuit.

37. The multi-sensor anticipatory object detection system of claim 36 in which each of said plurality of channels includes an amplifier circuit for varying the amplitude of the harmonic components thereby adjusting the relationship between the harmonic components relative to each other for each said modulation signal.

38. The multi-sensor anticipatory object detection system of claim 37 in which said pulse shaping circuit includes means for rectifying each said harmonic component.

39. The multi-sensor anticipatory object detection system of claim 35 in which at least one of said plurality of channels extracts the Doppler of the DC component of each said modulation signal.

40. The multi-sensor anticipatory object detection system of claim 35 in which at least one of said plurality of channels extracts the Doppler of the first harmonic component of each said modulation signal.

41. The multi-sensor anticipatory object detection system of claim 35 in which at least one of said plurality of channels extracts the Doppler of the second harmonic component of each said modulation signal.

* * * * *